(12) United States Patent
Komatsu et al.

(10) Patent No.: US 10,341,607 B2
(45) Date of Patent: Jul. 2, 2019

(54) DISPLAY DEVICE

(71) Applicants: Motoi Komatsu, Tokyo (JP); Yuji Kimura, Tokyo (JP); Riichiro Hibiya, Tokyo (JP)

(72) Inventors: Motoi Komatsu, Tokyo (JP); Yuji Kimura, Tokyo (JP); Riichiro Hibiya, Tokyo (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 0 days.

(21) Appl. No.: 16/092,255

(22) PCT Filed: Apr. 4, 2017

(86) PCT No.: PCT/JP2017/014135
§ 371 (c)(1),
(2) Date: Oct. 9, 2018

(87) PCT Pub. No.: WO2017/183445
PCT Pub. Date: Oct. 26, 2017

(65) Prior Publication Data
US 2019/0132547 A1 May 2, 2019

(30) Foreign Application Priority Data
Apr. 22, 2016 (JP) .................................. 2016-085893

(51) Int. Cl.
*G02B 26/10* (2006.01)
*G02B 26/08* (2006.01)
(Continued)

(52) U.S. Cl.
CPC ........... *H04N 7/102* (2013.01); *H04N 9/3161* (2013.01); *G02B 26/0858* (2013.01); *G02B 26/105* (2013.01)

(58) Field of Classification Search
CPC ............................ H04N 13/332; G02B 27/017
See application file for complete search history.

(56) References Cited

U.S. PATENT DOCUMENTS

| | | | | |
|---|---|---|---|---|
| 4,439,157 A | * | 3/1984 | Breglia | G02B 27/01 359/216.1 |
| 5,416,876 A | * | 5/1995 | Ansley | G02B 6/06 345/8 |

(Continued)

FOREIGN PATENT DOCUMENTS

| | | |
|---|---|---|
| JP | 2002-268621 | 9/2002 |
| JP | 2006-217520 | 8/2006 |

(Continued)

OTHER PUBLICATIONS

International Search Report for PCT/JP2017/014135 dated Jun. 20, 2017.

*Primary Examiner* — Paulos M Natnael
(74) *Attorney, Agent, or Firm* — IPUSA, PLLC

(57) ABSTRACT

A display device that includes an attachment part mountable on a head of a user, a control device to control the attachment part, and a transmission cable to connect the attachment part with the control device, further includes an imager; a first converter configured to convert a digital signal from the imager into an analog signal; a second converter configured to convert the analog signal into a video signal; a laser light generator configured to generate a laser light modulated depending on the video signal; an optical scanner configured to scan the laser light; and an optical projection system configured to project the scanned laser light to form an image. The imager, the first converter, the optical scanner, and the optical projection system are placed in the attachment part. The second converter and the laser light generator (Continued)

are placed in the control device. The analog signal and the laser light are transmitted via the transmission cable.

5 Claims, 4 Drawing Sheets

(51) Int. Cl.
    *H04N 9/31*     (2006.01)
    *H04N 7/10*     (2006.01)

(56) References Cited

U.S. PATENT DOCUMENTS

| | | | |
|---|---|---|---|
| 5,596,339 A | | 1/1997 | Furness, III et al. |
| 5,684,498 A | * | 11/1997 | Welch .................. G02B 27/017 345/13 |
| 6,369,779 B1 | * | 4/2002 | Bartlett ................ G02B 27/017 345/7 |
| 7,046,215 B1 | * | 5/2006 | Bartlett .................. G01S 5/163 345/8 |
| 8,717,481 B2 | * | 5/2014 | Kamiya ............... G02B 27/017 348/115 |
| 9,720,233 B2 | * | 8/2017 | Dopilka ............. G02B 27/0172 |
| 2004/0056870 A1 | * | 3/2004 | Shimoyama .......... G06T 19/006 345/629 |
| 2014/0293245 A1 | * | 10/2014 | Tani ................... G03B 21/2053 353/85 |

FOREIGN PATENT DOCUMENTS

| | | |
|---|---|---|
| JP | 2007-219562 | 8/2007 |
| JP | 2008-310130 | 12/2008 |

* cited by examiner

DISPLAY DEVICE

TECHNICAL FIELD

The present invention relates to a display device.

BACKGROUND ART

Conventionally, a display device has been known that is attached to the head of a user. For example, there has been a display device that includes a camera module, transmits a digital signal from the camera module to a control device via a cable, and allows the user to visually recognize an image generated by the control device (see, for example, Patent Document 1).

RELATED-ART DOCUMENTS

Patent Documents

[Patent Document 1] Japanese Unexamined Patent Application Publication No. 2008-310130

SUMMARY OF THE INVENTION

Problem to be Solved by the Invention

However, in a display device that transmits a digital signal via a cable, for example, in the case of transmitting an HDMI (registered trademark) signal as the digital signal, since the number of signal lines included in the cable increases, flexibility of the cable is lost.

In addition, in the case of transmitting an HDMI signal as the digital signal, or in the case of transmitting a signal other than an HDMI signal as the digital signal, unnecessary radiation may occur in either case.

In addition, a special IC or a memory for compressing and decompressing the digital signal to be transmitted is required, which causes a problem that the cost of the display device increases.

The present invention has been made in view of the above respects, and has an object to provide a display device that reduces unnecessary radiation and the cost increase, and secures flexibility of a cable.

Means for Solving the Problem

A display device (1) that includes an attachment part (10) mountable on a head of a user, a control device (20) to control the attachment part (10), and a transmission cable (30) to connect the attachment part (10) with the control device (20), further includes an imager (14); a first converter (11) configured to convert a digital signal from the imager into an analog signal; a second converter (21) configured to convert the analog signal into a video signal; a laser light generator (25, 26, 28) configured to generate a laser light modulated depending on the video signal; an optical scanner (15) configured to scan the laser light; and an optical projection system (16) configured to project the scanned laser light to form an image. The imager (14), the first converter (11), the optical scanner (15), and the optical projection system (16) are placed in the attachment part (10). The second converter (21) and the laser light generator (25, 26, 28) are placed in the control device (20). The analog signal and the laser light are transmitted via the transmission cable (30).

Note that the reference codes in the above parentheses are attached for the sake of easier understandability, namely, merely examples, and the embodiments are not limited as illustrated.

Advantage of the Invention

According to a disclosed technology, it is possible to provide a display device that reduces unnecessary radiation and the cost increase, and secures flexibility of a cable.

DETAILED DESCRIPTION OF THE PREFERRED EMBODIMENTS

In the following, embodiments will be described with reference to the drawings. Throughout the drawings, the same elements may be assigned the same reference codes, and duplicated description may be omitted.

Display Device According to Embodiment

Figure 1:
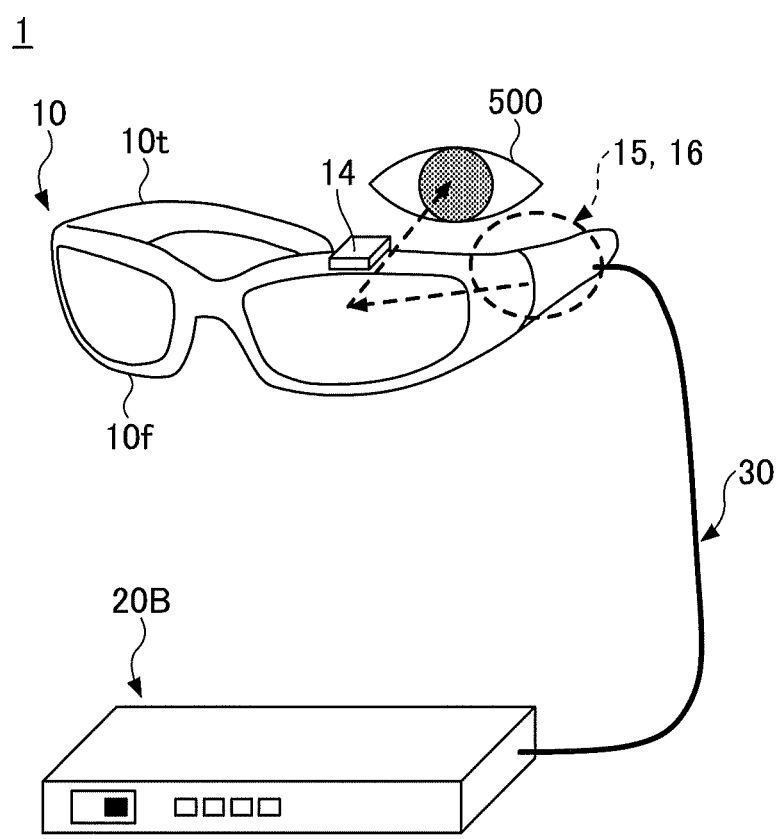
FIG. 1 is a perspective view exemplifying an appearance of a display device according to an embodiment.
Figure 2:
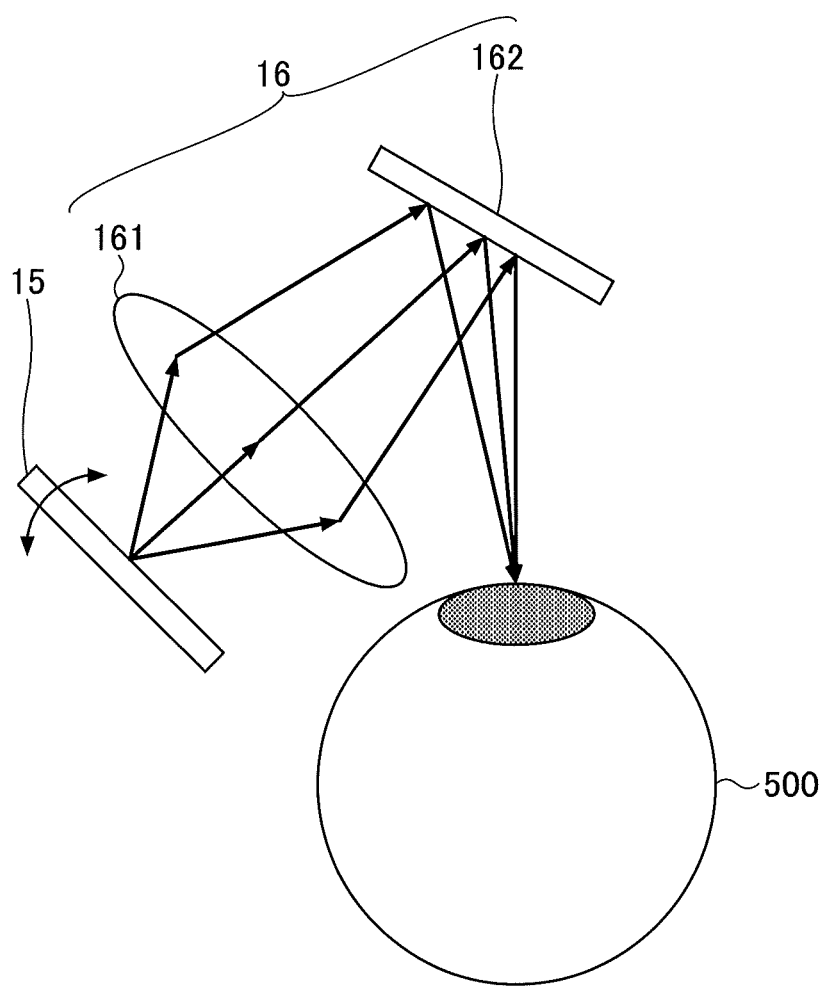
FIG. 2 is a schematic view exemplifying an optical projection system of a display device according to the embodiment.

FIG. 1 is a perspective view exemplifying an appearance of a display device according to an embodiment. FIG. 2 is a schematic diagram exemplifying an optical projection system of the display device according to the embodiment.

A display device 1 illustrated in FIG. 1 and FIG. 2 is a retinal-scanning, head-mounted display that directly projects an image on the retina of the user's eye. Since it is a retinal scanning type, images (virtual images) can be visually recognized irrespective of the eyesight. Therefore, for example, it can be used as a device for supporting people with weak eyesight.

The display device 1 has, as main components, an attachment part 10 that can be attached to the head of a user (wearer) and a control box 20B that has a control device 20 (described later) built in to control the attachment part 10. The control box 20B is, for example, a rectangular parallelepiped casing, and may provide various switches, a display unit, and the like as necessary. The attachment part 10 and the control device 20 in the control box 20B are connected by a transmission cable 30 including an optical fiber and an electric wire.

In the embodiment, as an example, the attachment part 10 has a shape of, for example, eyeglasses, and is constituted with a pair of fronts 10f and a pair of temples 10t arranged substantially symmetrically, on the right and left. The front 10f holds a lens (including the case of the lens power being zero).

The imager 14 is placed on the front 10f or the temple 10t. The imager 14 has a function of capturing entirely or partially an external scene entering the field of vision of the user of the attachment part 10. The imager 14 is, for example, a camera module that includes a CCD (Charge Coupled Device) image sensor, a CMOS (Complementary Metal Oxide Semiconductor) image sensor, and a drive circuit thereof.

One of the left and right temples 10t (the left eye side in FIG. 1) has an optical projection system 16 mounted, which includes an optical scanner 15, a lens 161, and a half mirror 162 illustrated in FIG. 2. In other words, the display device 1 has the optical scanner 15 and the optical projection system 16 mounted only on the side of one of the eyes. The optical scanner 15 and the optical projection system 16 can be disposed on either of the right eye side or the left eye side, and have a function to project an image on the retina of the eye on the disposed side.

The optical scanner 15 scans an incident laser light two-dimensionally, and the scanned laser light is directly projected onto the retina of an eyeball 500 of the wearer of the display device 1 via the lens 161 and the half mirror 162, to form a two-dimensional image.

The optical scanner 15 includes one mirror that swings with respect to, for example, two orthogonal axes. The optical scanner 15 may be, for example, MEMS (Micro Electro Mechanical Systems) manufactured by a semiconductor process or the like. The mirror of the optical scanner 15 may be driven by, for example, an actuator that uses the deforming force of a piezoelectric element as the driving force. Note that the optical projection system 16 may include optical components other than the lens 161 and the half mirror 162.

An image captured by the imager 14 is transmitted to the control device 20 via the transmission cable 30. Then, the control device 20 generates a laser light that is intensity-modulated with respect to colors of R (red), G (green), and B (blue) depending on a video signal. The laser light is emitted onto the optical scanner 15 of the attachment part 10 via the transmission cable 30, to be scanned, and an image is directly projected on the retina on the side of the attachment part 10 by the optical projection system 16.

Figure 3:
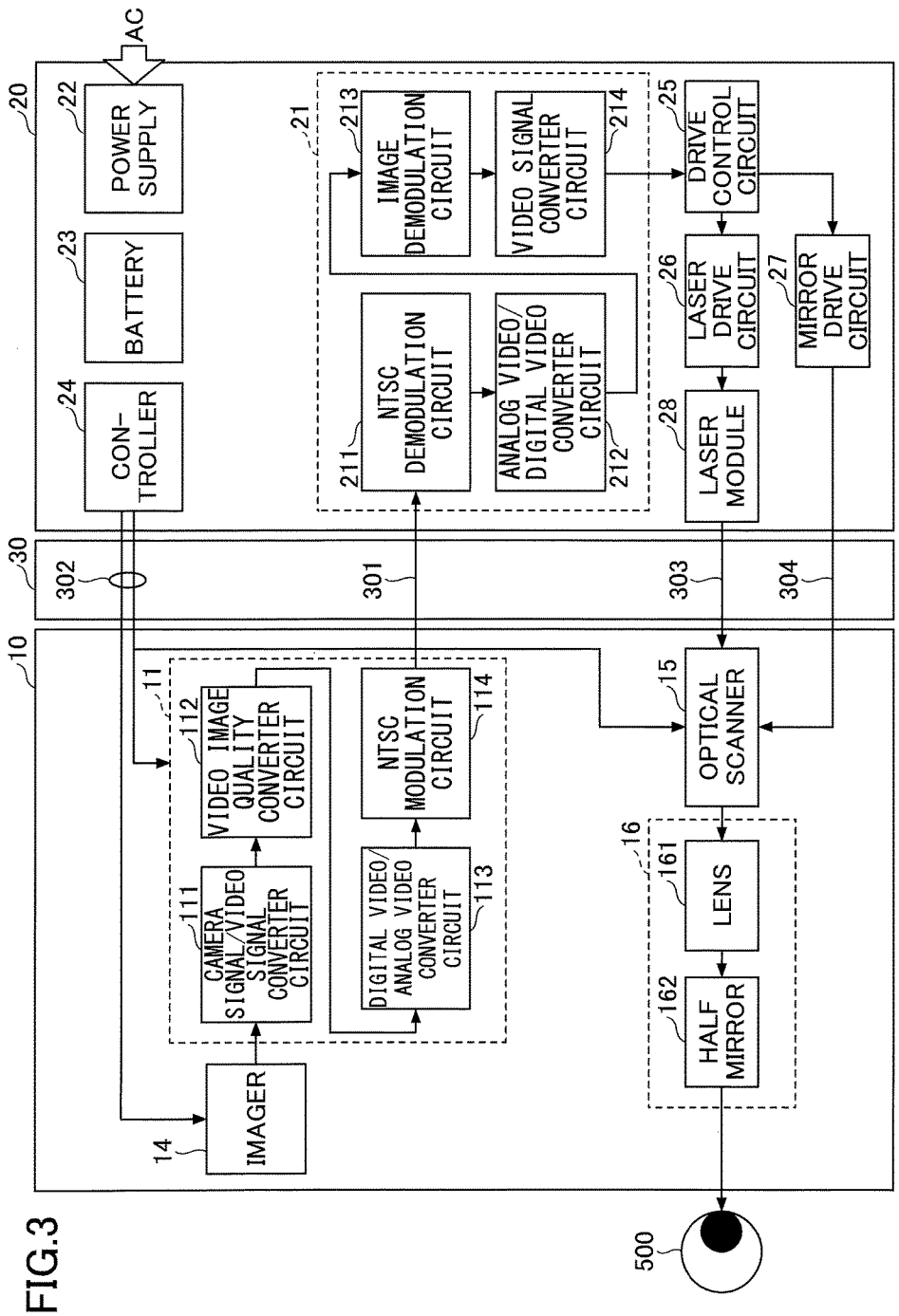
FIG. 3 is an example of a block diagram of a display device according to the embodiment.

FIG. 3 is an example of a block diagram of the display device according to the embodiment. As illustrated in FIG. 3, the attachment part 10 has a first converter 11 to convert a digital signal from the imager 14 into an analog signal. Here, although an example is illustrated in which an NTSC signal is used as the analog signal, it is not limited as such; any analog signal may be selected as long as the signal has a smaller amount of data to handle than the HDMI (High-Definition Multimedia Interface).

The first converter 11 includes a camera signal/video signal converter circuit 111, a video image quality converter circuit 112, a digital video/analog video converter circuit 113, and an NTSC modulation circuit 114.

The camera signal/video signal converter circuit 111 is a circuit to convert a camera signal output from the imager 14 into a video signal in a predetermined format. The video image quality converter circuit 112 is a circuit to convert a video signal obtained from the camera signal/video signal converter circuit 111 to have a necessary screen size (e.g., 720p is converted to 480i).

Note that 720p is one of the video signal formats of digital television broadcasting, which provides a video of progressive scan type with 720 effective scanning lines (750 total scanning lines) and the frame frequency of 60 Hz. The number of pixels is 1280×720 to have the aspect ratio of 16:9.

Also, 480i is one of video signal formats of digital television broadcasting, which provides a video of an interlaced scanning type with 480 effective scanning lines (525 total scanning lines) and the frame frequency of 30 Hz. The number of pixels is 720×480 to have the aspect ratio of 16:9, or 640×480 to have the aspect ratio of 4:3. The latter is close to that of NTSC.

The digital video/analog video converter circuit 113 is a DA converter circuit to convert a digital video signal obtained from the video quality converter circuit 112 into an analog video signal. The NTSC modulation circuit 114 is a circuit to modulate an analog video signal obtained from the digital video/analog video converter circuit 113, to generate an NTSC signal.

An NTSC signal generated by the NTSC modulation circuit 114 is transmitted to a second converter 21 of the control device 20 via an electric wire 301. Note that the electric wire 301 is, for example, a coaxial cable in which a signal line is surrounded by a GND line, to be shielded.

The second converter 21 is a block to convert an NTSC signal into a video signal (RGB signal), and includes an NTSC demodulation circuit 211, an analog video/digital video converter circuit 212, an image demodulation circuit 213, and a video signal converter circuit 214.

The NTSC demodulation circuit 211 is a circuit to demodulate an NTSC signal to generate an analog video signal. The analog video/digital video converter circuit 212 is an AD converter circuit that converts an analog video signal obtained from the NTSC demodulation circuit 211 into a digital video signal.

The image demodulation circuit 213 is a circuit to demodulate a digital video signal obtained from the analog video/digital video converter circuit 212 to image data. The video signal converter circuit 214 is a circuit to generate a video signal (RGB signal) from the image data obtained from the image demodulation circuit 213.

In addition to the second converter 21, the control device 20 includes a power supply 22, a battery 23, a controller 24, a drive control circuit 25, a laser drive circuit 26, a mirror drive circuit 27, and a laser module 28.

Power of a predetermined voltage is supplied from the power supply 22 to the second converter 21, the controller 24, the drive control circuit 25, the laser drive circuit 26, and the mirror drive circuit 27. The power supply 22 includes a circuit to convert an AC voltage to a predetermined DC voltage, and a circuit to select a voltage supplied from the battery 23 and the DC voltage converted from the AC voltage. The battery 23 is, for example, a lithium-ion battery.

The controller 24 controls the control device 20 as a whole and controls the imager 14 via an electric wire 302. The electric wire 302 includes the total of four lines, which are two control lines for controlling the imager 14, a power source line for supplying power to all circuit blocks of the attachment part 10 (the first converter 11, the optical scanner 15, and the other blocks), and a GND line.

The controller 24 may be configured to include, for example, a CPU (Central Processing Unit), a ROM (Read-Only Memory), a RAM (Random Access Memory), and a main memory. In this case, various functions of the controller 24 may be implemented by loading a program stored in the ROM or the like into the main memory, to be executed by the CPU. However, a part or the entirety of the controller 24 may be implemented only by hardware (ASIC, etc.).

The drive control circuit 25 controls the laser drive circuit 26 and the mirror drive circuit 27, based on a video signal (RGB signal) obtained from the video signal converter circuit 214.

The laser drive circuit 26 drives the laser module 28 based on a video signal from the drive control circuit 25. The laser module 28 has three color lasers of red (e.g., the wavelength of 640 nm), green (e.g., the wavelength of 530 nm), and blue (e.g., the wavelength of 445 nm) in which the quantity of emitted light is changed depending on a current value, and a light quantity detection sensor for monitoring the quantity of emitted light for each laser.

The laser drive circuit 26 supplies a predetermined current to each laser of the laser module 28. This causes the lasers to emit the respective laser lights of red, green, and blue modulated depending on a video signal, and synthesizing these enables to form a color image depending on the video signal.

At this time, the drive control circuit 25 monitors the output of the light quantity detection sensor (not illustrated) provided in the laser module 28, to control the light quantity of each laser of the laser module 28. In other words, currents into the lasers are controlled so as to produce a predetermined output (light quantity) by the drive control circuit 25.

The laser lights of the respective wavelengths emitted from the lasers are synthesized by a dichroic mirror or the like, attenuated to have a predetermined light quantity by a light attenuation filter or the like as necessary, and emitted onto the mirror of the optical scanner 15 via the optical fiber 303. Note that the drive control circuit 25, the laser drive circuit 26, and the laser module 28 are representative examples of a laser light generator according to the present invention.

The mirror drive circuit 27 is connected to the optical scanner 15 via an electric wire 304 including nine control lines, and based on a video signal from the drive control circuit 25, controls the deflection angle of the mirror of the optical scanner 15.

Specifically, the drive control circuit 25 monitors inclinations in the horizontal direction and in the vertical direction of the mirror of the optical scanner 15 obtained by, for example, a horizontal displacement sensor and a vertical displacement sensor provided in the optical scanner 15, to supply an angle control signal to the mirror drive circuit 27. Then, the mirror drive circuit 27 drives a piezoelectric element of the optical scanner 15 based on the angle control signal from the drive control circuit 25, and scans the mirror at a predetermined angle.

The electric wire 301, the electric wire 302, the optical fiber 303, and the electric wire 304 illustrated in FIG. 3 are bundled into one transmission cable 30 illustrated in FIG. 1, to connect the attachment part 10 with the control device 20.

As described above, the electric wire 301 is, for example, a coaxial cable and includes two lines. Also, the electric wire 302 includes four lines of two control lines, a power supply, and a GND. Also, the optical fiber 303 is a single wire having a core and a clad. Also, the electric wire 304 includes nine control lines. Therefore, the transmission cable 30 is constituted with 16 lines totaling these lines.

[Display Device According to a Comparative Example]

Figure 4:
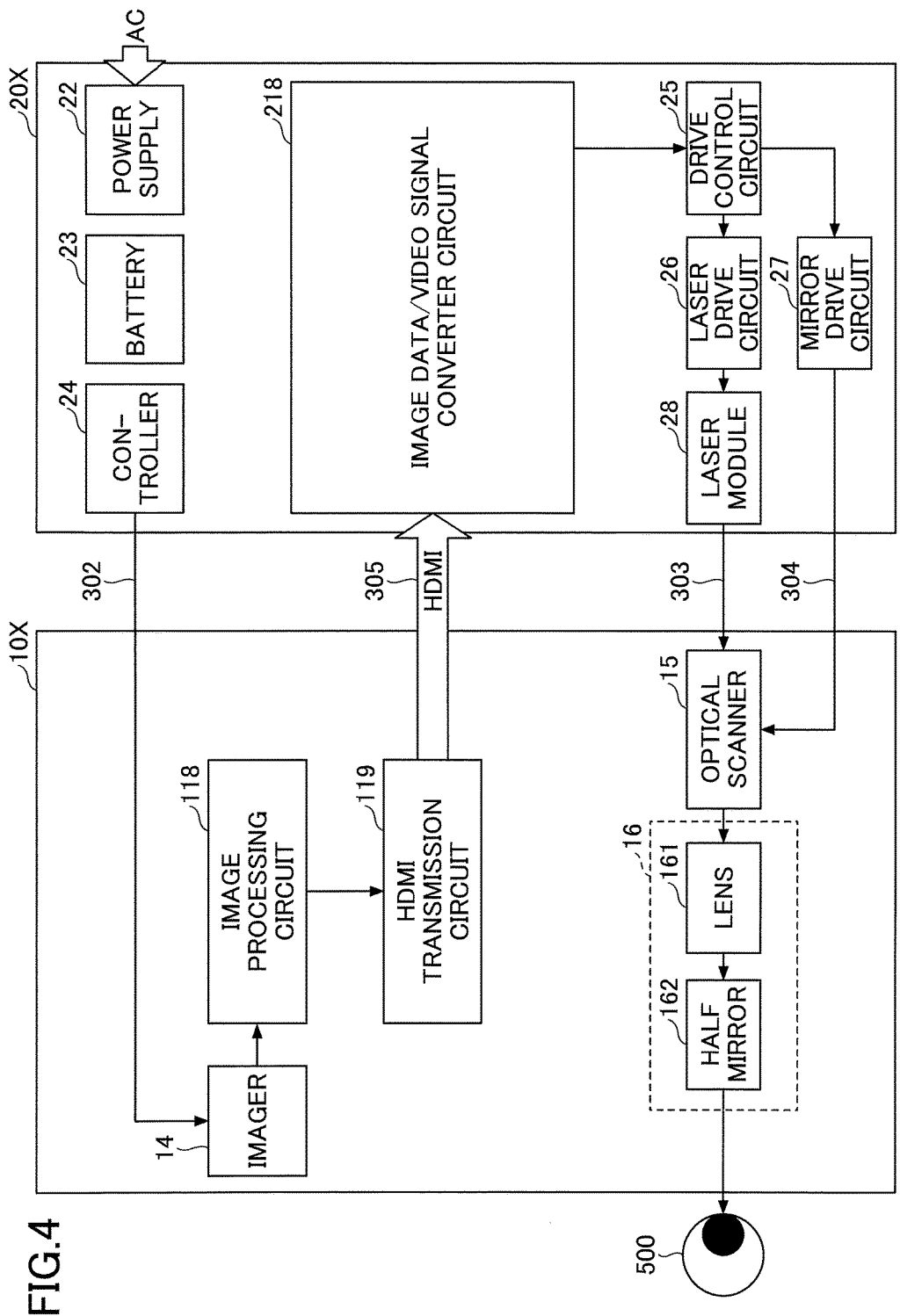
FIG. 4 is an example of a block diagram of a display device according to a comparative example.

FIG. 4 is an example of a block diagram of a display device according to a comparative example. As illustrated in FIG. 4, the display device according to the comparative example includes an attachment part 10X and a control device 20X. With reference to FIG. 4, differences from FIG. 3 will be mainly described.

The attachment part 10X is different from the attachment part 10 such that the first converter 11 to convert a digital signal from the imager 14 into an analog signal is replaced by an image processing circuit 118 and an HDMI transmission circuit 119. Also, the control device 20X is different from the control device 20 such that the second converter 21 to convert an NTSC signal into a video signal is replaced by an image data/video signal converter circuit 218.

The image processing circuit 118 is a circuit to convert a camera signal output from the imager 14 into a video signal in the HDMI format. The HDMI transmission circuit 119 is a circuit to transmit a video signal in the HDMI format obtained from the image processing circuit 118. The video signal in the HDMI format is transmitted from the HDMI transmission circuit 119 to the image data/video signal converter circuit 218 of the control device 20X via an HDMI cable 305. The HDMI cable 305 is a 19-pin cable.

The image data/video signal converter circuit 218 of the control device 20X is a circuit to receive a video signal in the HDMI format, to convert it into a video signal (RGB signal).

An electric wire 302, an optical fiber 303, an electric wire 304, and the HDMI cable 305 illustrated in FIG. 4 are bundled into one transmission cable 30X (not illustrated), which is similar to the transmission cable 30 illustrated in FIG. 1.

As described above, the electric wire 302 includes four lines of two control lines, a power supply, and a GND. Also, the optical fiber 303 is a single line having a core and a clad. Also, the electric wire 304 includes nine control lines. Also, the HDMI cable 305 includes 19 lines. Therefore, the transmission cable 30X is constituted with 33 lines totaling these lines.

As such, the display device 1 according to the embodiment uses an analog signal such as NTSC, not a digital signal such as HDMI, as a signal transmitted from the imager 14 via the transmission cable 30. This enables to apply a predetermined process to a signal from the imager 14 and to transmit the signal with two lines of a signal line and a GND line, and hence, enables to significantly reduce the number of lines compared with 19 lines in the case of using the HDMI.

In other words, in the display device 1 according to the embodiment, the transmission cable 30 can be constituted with 16 lines, and compared to the transmission cable 30X (constituted with 33 lines) of the display device according to the comparative example, 17 lines can be removed.

Thereby, the transmission cable 30 can have a structure that is light-weighted, compact, and flexible (bendable). In addition, it is possible to reduce unnecessary radiation from the transmission cable 30.

Further, since a standard analog video signal such as NTSC can be realized with low-price, general-purpose ICs, the manufacturing cost of the display device 1 can be reduced.

Meanwhile, the HDMI signal is capable of transferring a considerable amount of data per second. For example, in the case of 720p, the video signal amount is estimated as 1280 dots (horizontal)×720 dots (vertical)×24 bits (depth of color)×60 (frame frequency)=167 MB/s.

When the data capacity is large, the video signal may be compressed and decompressed, and the amount of data to be transmitted can be reduced by compressing the video signal amount. However, a problem may arise that a delay occurs when displaying a video due to the processing time for compression and decompression. In addition, a compression/decompression process requires high-performance processing and a memory for compression/decompression, which leads to a cost increase.

In contrast, in the case of NTSC, since the image quality is virtually equivalent to that of 480i (the number of pixels is 640×480, and the frame frequency is 60 Hz) and the data capacity is small, there is no need to apply compression and decompression to a video signal. Therefore, the transmission delay of a video can be avoided. In addition, high-performance processing and a memory for compression/decompression are not required, which leads to a cost reduction. Note that although NTSC is inferior to HDMI when comparing the image quality, NTSC can be considered to have a necessary and sufficient image quality when used in a head-mounted display application.

As above, preferred embodiments have been described. Note that the present invention is not limited to the above embodiments, and various changes and replacements can be made in the above embodiments and the modified example without deviating from the scope of the present invention described in the claims.

For example, in the above embodiment, although the attachment part has a shape of eyeglasses, the attachment part does not need to have a shape of eyeglasses necessarily. For example, the attachment part having a built-in optical projection system may have a shape that is attachable and detachable on general eyeglasses worn by the wearer on the head. In this case, by configuring the attachment part to be attachable and detachable on either side of the eyeglasses on the right eye side or the left eye side, various users can use it in accordance with the dominant eye.

In addition, the display device according to the above embodiment can be used not only for a retinal-scanning, head-mounted display, but also as a method for realizing a delay-free video signal in various wearable terminals.

This international application is based on and claims priority to Japanese application No. 2016-085893 filed on Apr. 22, 2016, and the entire contents of Japanese Patent Application No. 2016-085893 are incorporated into this international application.

DESCRIPTION OF REFERENCE CODES 1 display device
10 attachment part
10f front
10t temple
11 first converter
14 imager
15 optical scanner
16 optical projection system
20 control device
20B control box
21 second converter
22 power supply
23 battery
24 controller
25 drive control circuit
26 laser drive circuit
27 mirror drive circuit
28 laser module
111 camera signal/video signal converter circuit
112 video image quality converter circuit
113 digital video/analog video converter circuit
114 NTSC modulation circuit
161 lens
162 half mirror
211 NTSC demodulation circuit
212 analog video/digital video converter circuit
213 image demodulation circuit
214 video signal converter circuit
301, 302, 304 electric wire
303 optical fiber
500 eyeball

The invention claimed is:

1. A display device that includes
an attachment part mountable on a head of a user,
a control device to control the attachment part, and
a transmission cable to connect the attachment part with the control device,
the display device comprising:
an imager;
a first converter configured to convert a digital signal from the imager into an analog signal;
a second converter configured to convert the analog signal into a video signal;
a laser light generator configured to generate a laser light modulated depending on the video signal;
an optical scanner configured to scan the laser light; and
an optical projection system configured to project the scanned laser light to form an image,
wherein the imager, the first converter, the optical scanner, and the optical projection system are placed in the attachment part,
wherein the second converter and the laser light generator are placed in the control device, and
wherein the analog signal and the laser light are transmitted via the transmission cable.

2. The display device as claimed in claim 1, wherein the optical projection system projects the image onto a retina of an eye of the user.

3. The display device as claimed in claim 1, wherein the first converter includes a circuit to generate an NTSC signal as the analog signal, and
wherein the second converter includes a circuit to demodulate the NTSC signal and a circuit to generate the video signal based on the demodulated NTSC signal.

4. The display device as claimed in claim 1, wherein the analog signal is transmitted by one signal line and one GND line included in the transmission cable.

5. The display device as claimed in claim 4, wherein the one signal line and the one GND line included in the transmission cable are formed as a coaxial cable.

* * * * *